United States Patent Office 3,306,634
Patented Feb. 28, 1967

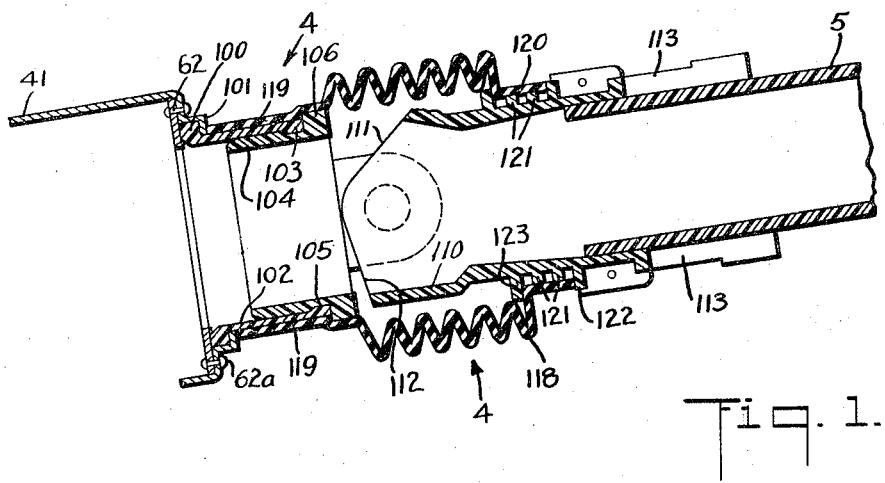
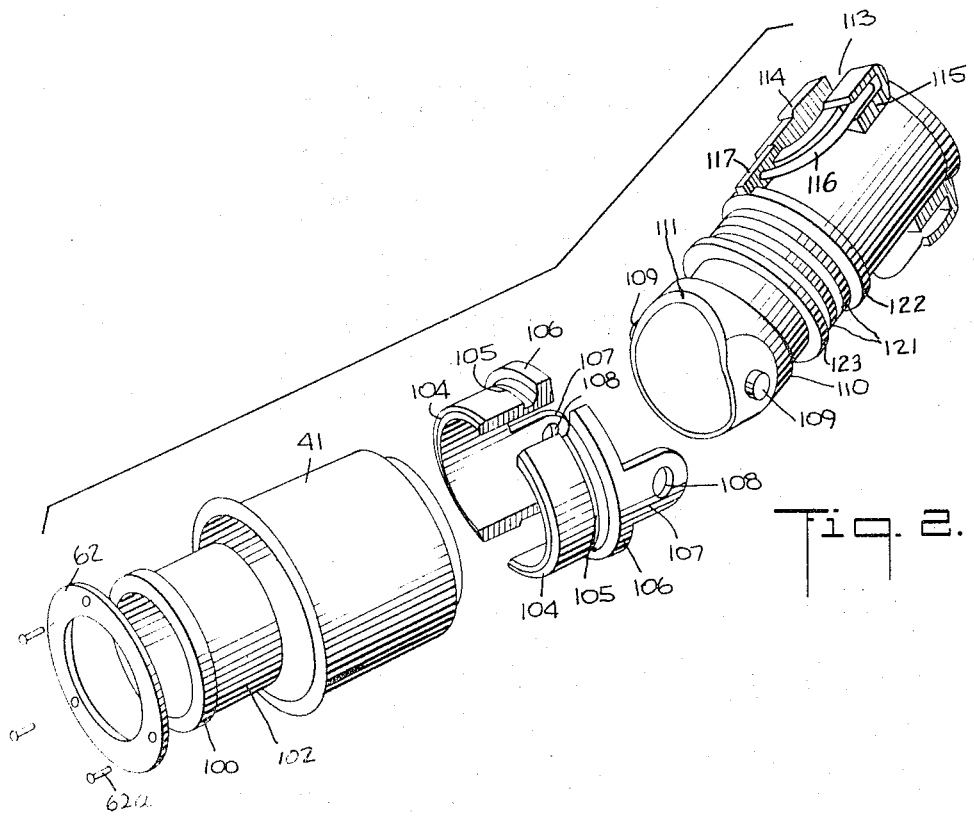

3,306,634
ARTICULATE JOINT
Martin V. Groves, Greenwood Lake, and Michael Mastromatteo, Hartsdale, N.Y., assignors to Pul-Vac, Inc., New York, N.Y., a corporation of New York
Original application Feb. 7, 1963, Ser. No. 256,915, now Patent No. 3,204,282, dated Sept. 7, 1965. Divided and this application Mar. 8, 1965, Ser. No. 438,014
2 Claims. (Cl. 285—7)

This application is a division of our copending application S.N. 256,915 filed February 7, 1963 for Suction Actuated Head and now Patent No. 3,204,282.

This invention relates to articulate joints. Certain features of the invention are especially useful with vacuum cleaners. The invention is in the nature of an improvement over the subject matter of Martin V. Groves Patent No. 3,054,131 patented September 18, 1962.

An important aspect of the invention contemplates a novel articulate and swivel joint for connecting a pair of air conduits and especially adapted for attachment to the wand of a vacuum cleaner.

Various further and more specific objects, features and advantages of this invention will appear from the description taken in connection with the accompanying drawings which form a part of this specification and illustrate by way of example an embodiment of the invention and certain modifications thereof. The invention consists of such novel features and combination of parts as may be shown and described in connection with the apparatus herein disclosed.

In the drawings:

FIG. 1 is a sectional view of an articulate joint constructed in accordance with the invention;

FIG. 2 is an exploded view in perspective showing further details of the articulate joint shown in FIG. 1;

Referring more particularly to FIGS. 1 and 2: an articulate joint 4 is secured at its forward end to an air conduit 41 by means of a flange 100 which is provided on the forward end of a sleeve 102. Flange 100 is seated in an annular recess 101 integrally formed in an end of an air conduit 41 and is held locked therein by the ring washer 62, secured to the conduit 41 by suitable means such as rivets 62a, while permitting relative sliding movement about the longitudinal axis of the sleeve 102. Sleeve 102 is provided at its rear end with an internal annular flange and is formed of relatively stiff material, such as plastic, which is sufficiently resilient to permit a slight expansion of the internal annular flange 103. A yoke sleeve is provided by identical oppositely disposed members such as 104 which, when brought into closed position, fit within the sleeve 102 with a snug fit. The sleeve sections 104 are provided with an external annular groove such as 105 which is adapted for interfitting engagement with the flange 103 on the sleeve 102 and are likewise provided with outwardly extending flanges such as 106, the forward faces of which are in abutting engagement with the rear end of the sleeve 102. The sleeve sections 104 are provided at their rear end with a pair of of yokes such as 107 provided with trunnion holes such as 108 adapted to receive corresponding trunnion lugs such as 109 extending outwardly in diametrically opposite relationship on a hollow tubular member 110. In assembling the device, the half section members 104 are brought together so that the trunnion lugs are disposed within the corresponding holes 108 respectively and the sleeve sections 104 are held together and are forced within the sleeve 102 until the internal flange 103 snaps into the corresponding grooves 105, at which time the parts are locked in assembled position. At this point it is noted that before the device is assembled, the sleeve 102 is passed through the opening in the end of the air conduit 41 where it is locked against axial movement by means of the ring washer 62 but is permitted rotatable movement about its axis. The forward end of the member 110 is so disposed with respect to the axis passing through the centers of the trunnion lugs 109 as to permit angular movement between the members 109 and the air conduit 41 and its front walls are tapered rearwardly on one side along a plane 111 so as to provide an articulate action of about 50° between said portion and the rear end of the sections 104 and on the opposite side of the trunnion pivotal axis the member 110 is tapered along the plane 112 which determines the articulate movement of the member 110 in the opposite direction. It has been found that for use in the suction line between a vacuum cleaner wand and a vacuum cleaner head for use in floor or floor covering cleaning, the upper angle provided by the plane 111 should be about 50° and the lower angle provided by the plane 112 should be about 15°. Where the articulate joint 4 is intended for use in connection with vacuum cleaner heads for other purposes, such as the cleaning of draperies or upholstery, an angle of about 50° on each side should be provided.

The member 110 is of generally tubular structure for the passage of air therethrough and the rear end is adapted to receive the terminal end of a suction conduit from vacuum cleaner such as wand 5. In order to insure a tight frictional fit with the said wand, or with an adapter sleeve to be used in conjunction with said wand, the rear end of the member 110 is provided with oppositely opposed slots such as 113 which are each defined with a reinforcing U-shaped web such as 114, the lugs of which are provided with oppositely disposed outwardly facing cavities such as 115 for receiving slidably disposed therein the spaced apart ends of a loop of heavy spring wire 116 which is anchored at a median point and passing through a hole provided in a web 117. The springs 116 are sufficiently strong to retain the width of the slots such as 113 to the normal condition but are sufficiently resilient to yield to receive the end of a tubular member of somewhat larger diameter than the bore of the member 110 and to hold the parts together with a gripping action.

In order to make the articulate joint 4 airtight, a corrugated flexible sleeve 118, which may conveniently be made of elastomeric material, is provided having a cylindrical tubular front end 119 snugly fitting over the tubular shell 102 and with a cylindrical tubular rear end 120 snugly fitting over a plurality of spaced apart annular flanges 121 formed on the member 110 and disposed between the spaced apart flanges 122 and 123, to thereby form an airtight connection between the tubular end 120 and the member 110.

While the invention has been described in detail with respect to certain preferred embodiments, it will be understood by those skilled in the art that various changes and modifications may be made without departing from the spirit and scope of the invention and it is intended to cover all such changes and modifications in the appended claims.

We claim:

1. An articulate joint for connecting a pair of air conduits comprising, a first tubular member having an outer rear end for substantially airtight interfitting engagement with an end of one of said conduits and having adjacent its inner front end a pair of diametrically opposed outwardly extending trunnions defining an articulate axis, the inner end of said first tubular member on one side of said axis being tapered outwardly and rearwardly toward the rear end of said tubular member along a plane parallel with said trunnion axis and intersecting the axis of said tubular member forwardly of said trunnions, a second tubular member in axial alignment with said first tubular member and having an inner rear end spaced therefrom and an outer forward end for substantially airtight attachment to an end of the other of said conduits, a pair of semi-circular tubular sleeves provided with rearwardly extending trunnion lugs in pivotal engagement with said trunnions, said semi-circular sleeves when assembled providing a forward external diameter having a snug interfitting engagement within the second tubular member, means for locking said semi-circular sleeve and second tubular member in assembled relationship and a flexible tubular boot having a rear end surrounding and in sealing engagement with said rear tubular member and a forward end surrounding and in sealing engagement with said front tubular member.

2. An articulate joint as set forth in claim 1 in which the inner end of said first tubular member is tapered on both sides of said axis along planes parallel with the trunnion axis and intersecting the axis of said tubular member forwardly of said trunnions with the plane of the taper on one side being at a substantially greater angle to the tube axis than the plane of the taper on the other side.

No references cited.

CARL W. TOMLIN, *Primary Examiner.*

THOMAS F. CALLAGHAN, *Examiner.*